United States Patent [19]

Wolfe

[11] 4,119,340

[45] Oct. 10, 1978

[54] ROOF WINDOW FOR CRANE OPERATOR'S CAB

[75] Inventor: Roger M. Wolfe, Toddville, Iowa

[73] Assignee: Harnischfeger Corporation, Milwaukee, Wis.

[21] Appl. No.: 820,780

[22] Filed: Aug. 1, 1977

[51] Int. Cl.² .............................................. B60J 7/08
[52] U.S. Cl. .................................. 296/137 B; 49/253
[58] Field of Search ............... 296/137 B; 49/253, 246

[56] References Cited

U.S. PATENT DOCUMENTS 1,009,889  11/1911  Brandenberg .......................... 49/253

FOREIGN PATENT DOCUMENTS 568,871  5/1944  United Kingdom ...................... 49/253

Primary Examiner—Robert R. Song
Attorney, Agent, or Firm—James E. Nilles

[57] ABSTRACT

A movable window unit for an opening in the roof of a crane operator's cab is swingable between a closed position overlying the opening and an open position clear of the opening and adjacent the rear side of the cab to enable the crane operator to have an unobstructed direct view of the upwardly projecting crane boom.

8 Claims, 11 Drawing Figures

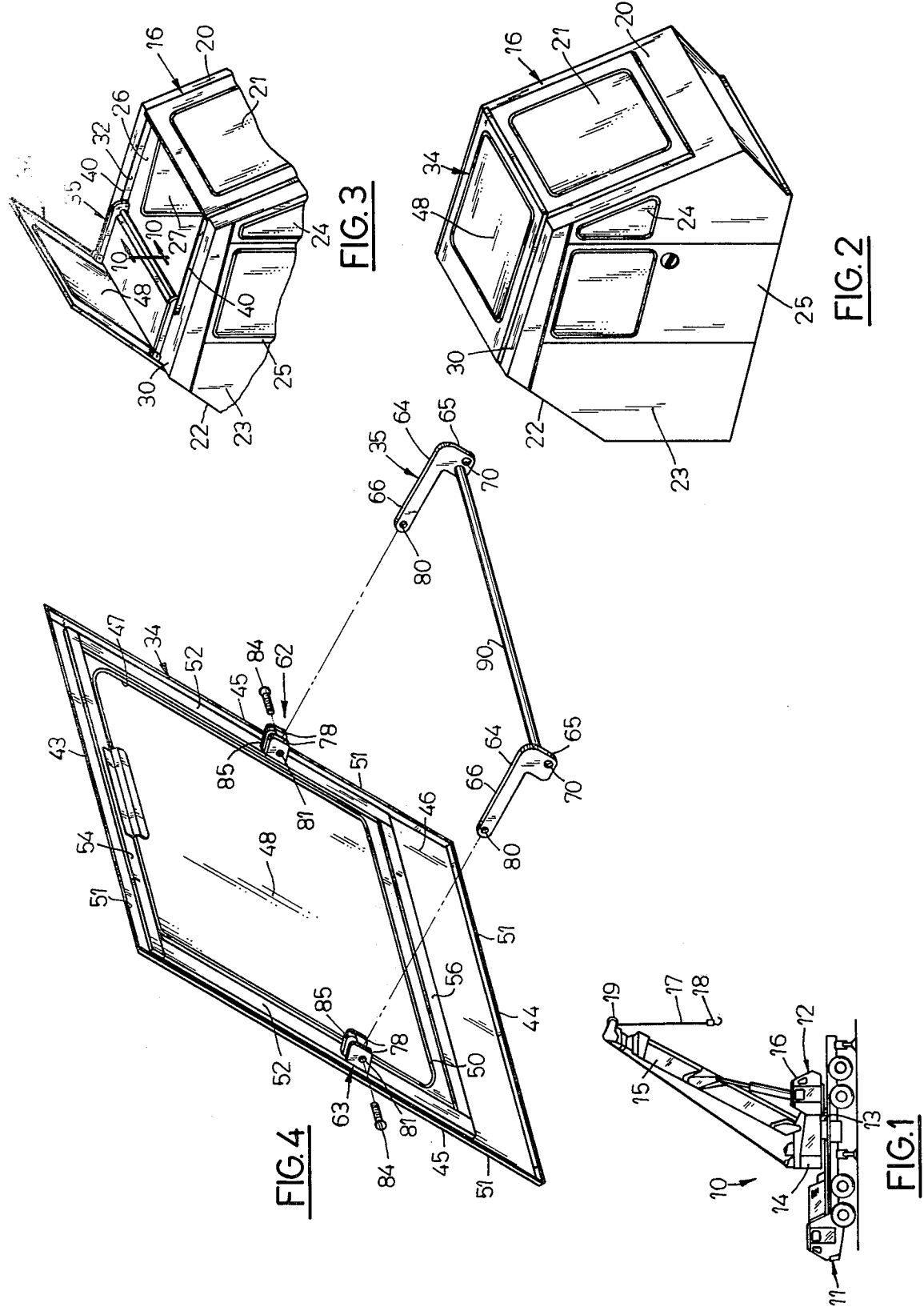

ROOF WINDOW FOR CRANE OPERATOR'S CAB

BACKGROUND OF THE INVENTION

1. Field of Use

This invention relates generally to movable window units for the roof of a crane operator's cab.

2. Description of the Prior Art

In some mobile truck cranes wherein a rotatable crane upper is mounted on a carrier, the crane upper includes a crane operator's cab which has windows on all sides thereof, including the roof, to provide the crane operator with maximum visibility and enable him to see the surrounding environment, the load being handled by the crane, and the crane boom. In some prior art cranes, the window in the cab roof is fixedly mounted in an opening in the cab roof and a defroster and windshield wiper are provided to keep the roof window clear so that the operator can see the boom therethrough. Also, the window creates distortion and is not too acceptable when maximum visibility is desired. In other cranes, the roof window can be moved between open and closed positions since many crane operators prefer to be able to view the boom and the machinery and cable at the end of the boom directly, thereby ensuring greater certainty and safety in crane operations. Since, on hydraulic machines, booms are typically hinged behind the operator and boom angles are 80° from horizontal, a directly overhead view without window obstruction is required.

SUMMARY OF THE PRESENT INVENTION

In accordance with the present invention, a crane operator's cab on the rotatable upper section of a mobile truck crane has a hinge-mounted movable window unit for an opening in the cab roof. The opening is defined by front, rear, and lateral edge members in the cab roof. The window unit can be swung between a closed position wherein it overlies the opening and an open position adjacent the rear side of the cab and clear of the opening to enable the crane operator to have a direct, unobstructed view of the crane boom, and, especially the point thereof. The movable window unit comprises a window frame having front, rear, and lateral sides and a transparent window mounted in the frame. Hinge means are connected between the lateral edge members defining the roof opening and the lateral sides of the window frame. The hinge means comprise a pair of L-shaped hinge pivot links, a pair of first pivot pins for pivotally connecting one end of the hinge pivot links to first hinge members on the lateral side edge members of the opening at first points, and a pair of second pivot pins for pivotally connecting the other end of the hinge links to second hinge members on the lateral side of the window frame. A rigid brace extends between and is rigidly connected to the pair of hinge pivot links to ensure simultaneous coordinated movement of the pivot links during operation. When the window is in closed position, the second pivot pins are located between the aforesaid first points and the front edge of the opening in the roof of the cab. When the window is swung to open position, the pivot links pivot about the first pivot pins and the second pivot pins move in a path over and around and to the rear of the first pivot points. In open position, the hinge pivot links bear against a stop member and the window unit tilts under the force of gravity about the second pivot pins so that the window unit lies against the rear of the cab.

A movable window unit and the hinge means therefor in accordance with the invention offer several advantages over prior art arrangements. For example, the window unit and hinge means are relatively easy and economical to manufacture, are simple and foolproof in operation and employ a minimum number of working parts. Furthermore, the window unit when closed forms a good weather-tight seal overlying the entire opening of the roof of the cab and when in open position is swung clear of the opening on the exterior of the cab but in such a position that the window unit is somewhat protected by the cab itself against possible damage and wind forces. Since a window unit in accordance with the invention can be easily opened and closed and does not require cranks, latches, and other mechanisms, as is the case of prior art arrangements, it is convenient for the crane operator to open the window when required. Furthermore, the window unit remains in both the closed position and the open position under the force of gravity and does not depend on latching means of any kind to maintain itself in either position. Other objects and advantages of the invention will hereinafter appear.

BRIEF DESCRIPTION OF THE DRAWINGS

FIG. 1 is a side elevational view of a mobile crane having a crane operator's cab which employs a movable cab roof window unit in accordance with the invention;

FIG. 2 is an enlarged perspective view of the cab shown in FIG. 1 and showing the window unit in closed position;

FIG. 3 is a view of the cab similar to FIG. 2 but with portions broken away and showing the window unit in open position;

FIG. 4 is an enlarged exploded perspective view of the window unit and hinge means therefor in open position;

DESCRIPTION OF A PREFERRED EMBODIMENT

Figure 5:
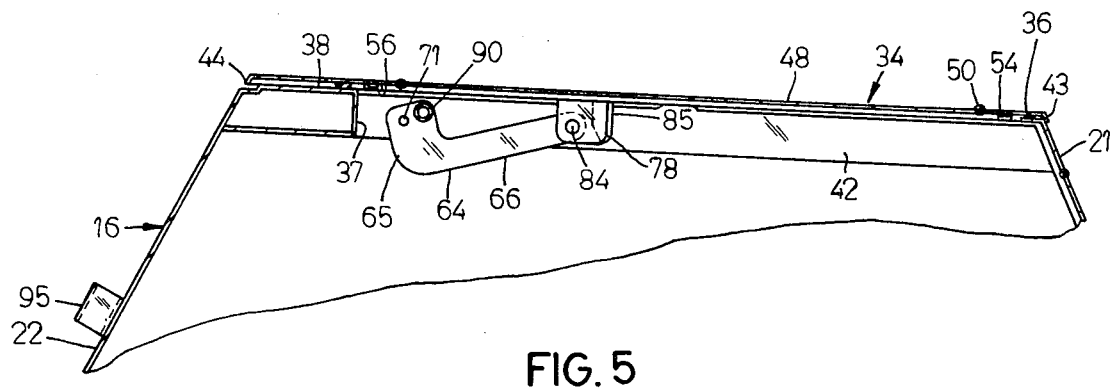
FIG. 5 is an enlarged cross-section view of the window unit showing it in closed position.
Figure 11:
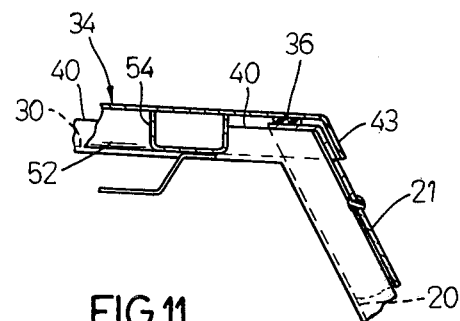
FIG. 11 is an enlarged cross-section view of a portion of the top front portion of the cab.
Figure 6:
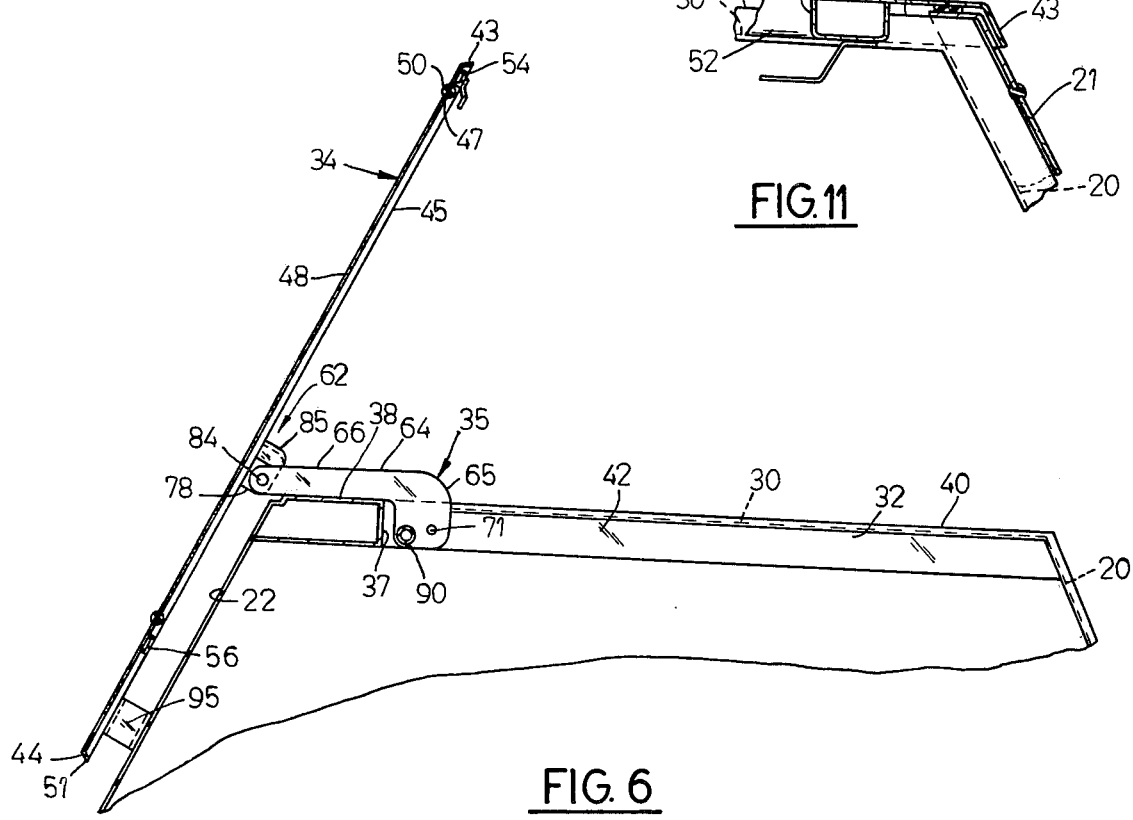
FIG. 6 is an enlarged cross-section view of the window unit showing it in open position.

Referring to FIG. 1, there is shown a mobile crane 10 which comprises a lower section 11 in the form of a truck and an upper section 12 which is rotatably mounted on the truck. Upper section 12 comprises a frame 13, a machine house 14 mounted on the frame, a telescopic crane boom 15 pivotally mounted on the frame, and a crane operator's cab 16 mounted on the frame. A hoist line 17 having a load hook 18 at the free end thereof is reeved over a sheave 19 at the point end of boom 15. Crane upper 12 is horizontally rotatable or swingable on truck 11, the crane boom 15 is pivotally movable vertically, and the load hook 18 is vertically movable, all such operations being controlled by a crane operator in cab 16.

Referring to FIGS. 2 and 3, cab 16 comprises a sloped front side 20 having a front window 21 therein, a sloped rear side 22 which is understood to have a rear window (not shown) therein, a right lateral side 23 having a right side window 24 and a door 25 therein, and a left lateral side 26 having a left side window 27 therein. Cab 16 also comprises a roof 30 which is provided with a rectangular opening 32 therethrough and with a window unit 34 having hinge means 35 in accordance with the invention. Window unit 34 is movable between a closed position shown in FIG. 2 and an open position shown in FIG. 3, as hereinafter described in detail.

As FIGS. 3, 5, 6, 8, 9, 10 and 11 show, roof 30 is formed of sheet metal components and the opening 32 is defined as follows. The front edge of opening 32 is defined by the top edge of front window 21 as FIGS. 3, 5, 6, and 11 show. The rear edge of opening 32 is defined by a sheet metal member 37 which extends downwardly vertically from a rear section 38 of roof 30, as FIGS. 3, 5, 6, and 10 show. The lateral edges of the opening 32 are each defined by an upwardly extending vertical sheet metal member 40, as FIGS. 3, 5, 6, 8, 9, and 10 show. The lateral edge members 40 extend upwardly from, and are part of, box frames 41 at the lateral sides of the opening 32 and the box frames 41 include an inner side member 42 to which the hinge means are connected, as hereinafter explained.

The upwardly extending members 36 and 40 around opening 32 are provided with a synthetic rubber sealing gasket 59. Flat polyester foam sealing gaskets 36 and 60 extend along and are secured to the front section and rear section 38, respectively, of roof 30 adjacent the opening 32.

Figure 10:
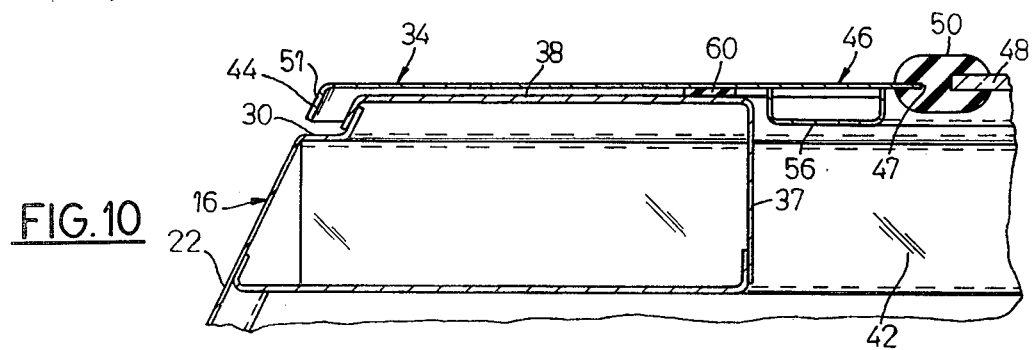
FIG. 10 is a view taken on line 10—10 of FIG. 3 and is a cross-sectional view of the rear edge member of the roof opening and shows the window unit in closed position.

The window unit 34 comprises a window frame 46 which comprises a front side 43, a rear side 44, and lateral sides 45 which define an opening 47. A transparent glass or plastic window 48 is mounted in opening 47. Window 48 is secured in opening 47 to window frame 46 by means of a flexible window channel gasket 50, formed of rubber material, for example, as shown in FIG. 10. Gasket or mounting means 50 engages the edge of the window 48 and the edge of the window frame 46. Frame 46 has downwardly depending flanges 51 along its lateral sides 45 and its front and rear sides 43 and 44, respectively. Frame 46 is strengthened by means of channel-shaped lateral side members 52 and channel-shaped front and rear members 54 and 56, respectively.

Figure 7:
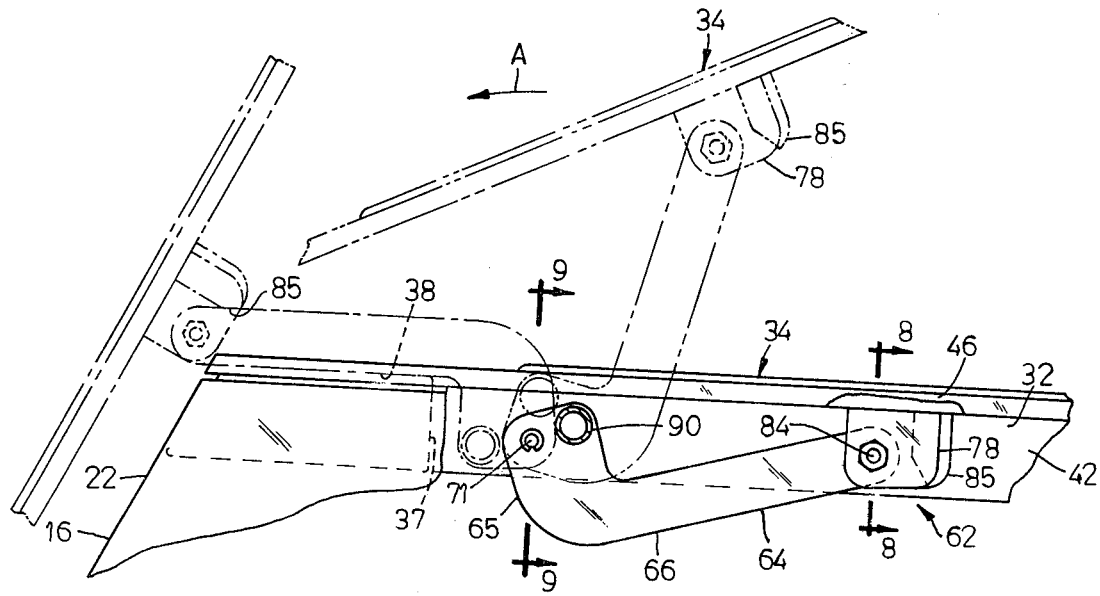
FIG. 7 is an enlarged view, partly in phantom, showing a hinge pivot link of the hinge means in both closed and open position.
Figure 9:
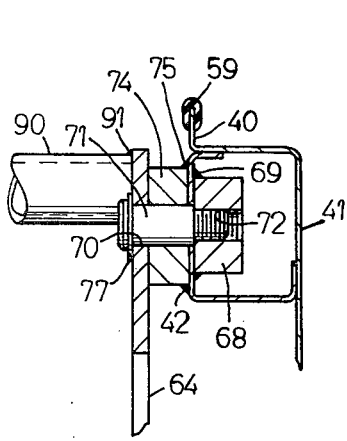
FIG. 9 is a view taken on line 9—9 of FIG. 7 but shows the pivot link in open position.
Figure 8:
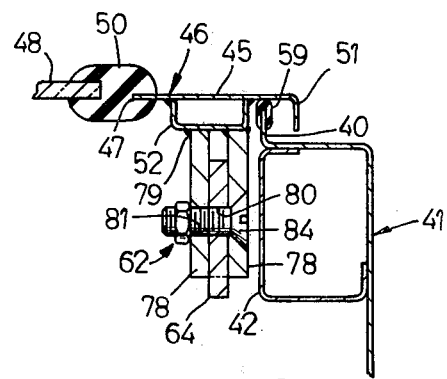
FIG. 8 is a cross-sectional view taken on line 8—8 of FIG. 7 showing a lateral edge member of the opening, an associated lateral side of the window unit, and a pivot link of the hinge means in closed position.

The hinge means 35 comprises a pair of hinge assemblies 62 and 63, one for each lateral side 45 of the window unit 34. Since the hinge assemblies 62 and 63 are identical, only assembly 62 is hereinafter described in detail. As FIGS. 7, 8, and 9 best show, hinge assembly 62 includes a roof pivot link 64 which is of generally L-shaped configuration, having a short leg 65 and a long leg 66. First pivot means are provided to secure the leg 65 to a first pivot point on the lateral edge member alongside opening 32, as FIGS. 7 and 9 show. Second pivot means are provided to secure the leg 66 to the window unit 34, as FIGS. 7 and 8 show.

The first pivot means comprise a collar 68 having a threaded hole 72 therein, which collar is welded as at 69 to the inner side of wall 42 of lateral edge member 41. Pivot link 64 has a hole 70 in its leg 65 for accommodating a bolt 71 which extends therethrough and screws into threaded hole 72 in collar 68. A spacer in the form of a large boss 74 is disposed between pivot link 64 and wall 42 and is welded to wall 42 as at 75. A flat washer 77 is located beneath the head of bolt 71 and pivot link 64. This arrangement enables pivot link 64 to pivot about the bolt 71. The bolt 71 serves as a first pivot pin located at the first pivot point. The second pivot means comprise a pair of spaced apart brackets 78 which are welded as at 79 to the underside of lateral side members 52 of window frame 34. Each bracket 78 has a screw receiving hole 81 therethrough. Pivot link 64 has a hole 80 in its leg 66 for accommodating a flat head screw 84 which extends therethrough and through the holes 81 and screws into a jam nut 83. This arrangement enables the brackets 77 to pivot about the screw 84. The screw 84 serves as a second pivot pin located at a second pivot point.

A rigid brace 90 in the form of an elongated hollow tubular member extends between the pivot links 64 and has its opposite ends rigidly secured to a pivot link as by welding at 91. The brace 90, acting as a torsional restraint, serves to cause the pivot links 64 to move together in synchronism and thereby prevents one or the other of the links from jamming as the window unit 34 is swung between open and closed positions. Preferably, the brace 90 is located near the aforementioned first pivot point.

As FIG. 7 shows, when window unit 34 is in closed position, the second pivot point of each pivot link 64 is disposed between the first pivot point and the front edge of the roof opening 34 defined by the top edge of the front window. When the window unit 34 is in closed position, the weight thereof acts directly downwardly and rests on the gaskets 59 and 36 making for an efficient weather-tight seal. To open the window unit 34, the operator reaches upward and pushes on the window unit in the region ahead of the hinge means. As this occurs, the pivot links 64 pivot about the first pivot points defined by the bolts 71. As this occurs, the window unit 34 is also able to pivot about the second pivot points defined by the screws 84. It is to be understood that the hinge assemblies 62 and 63 are so located with respect to window unit 34 that the center of gravity of the window unit is between the second pivot point and the rear edge of the window unit 34 and near the former. As a result of this arrangement, as the links 64 swing rearwardly in the direction of arrow A in FIG. 7, the window unit 34 tends to tilt counterclockwise (with respect to FIG. 7) about the second pivot point. When the pivot links 64 have moved as far as possible about the first pivot points, the pivot links 64 rest on the rear surface 38 of the roof. The tendency of the window unit 34 and link 64 to tilt counterclockwise about the second pivot point causes the window unit to assume the position shown in FIGS. 3, 6, and 7 clear of the opening 32 and out of the line of sight of the cab operator as he looks toward the point of the crane boom 15. Preferably, a stop member 95 is provided on the rear side 22 of the cab 16 against which the window unit 34 can rest.

To move the window unit 34 from open to closed position, the operator grasps the front edge of the window unit and pulls downwardly and forwardly thereupon to cause the pivot links 64 to swing in a clockwise direction (with respect to FIG. 7) about the first pivot points. As this occurs, the pivot links 64 finally assume the position shown in FIG. 7 and the window unit 34 assumes the closed position.

A stop member 85 is provided between each pair of brackets 78 and is welded in a fixed position relative thereto. The stop member 85 engages the upper side of the pivot link 64 when the latter is in its rearwardmost position and prevents the window unit 34 from tilting clockwise (with respect to FIG. 6) when the window unit is in the open position. The stop member also causes the pivot link 64 to swing clockwise (with respect to FIG. 6) when the operator grasps the upwardly extending edge of window unit 34 to commence movement thereof to closed position. More specifically, if an attempt is made to pull forwardly and downwardly on the window unit 34 when it is in the position shown in FIG. 6, the stop member 85 bears against the upper surface of the link 35 and the link must necessarily rotate clockwise about the first pivot point (with respect to FIG. 6). Once the leg 66 of link 64 extends generally upwardly and the window unit 34 assumes a generally horizontal position, the stop member 85 becomes disengaged from the link 64 and remains disengaged when the window unit is in closed position as shown in FIG. 7.

It will be understood that when the window is in the open position, the links 64 bear against the stop members 85 and the rear edge of the window unit rests on the stop member 95. This results in the entire window unit being supported by the stop member 95 and the pivot points 71.

I claim:

1. In an operator's cab for a crane or the like:
   a cab having a rear side and a roof with a roof opening in the latter;
   a movable window unit;
   and a pair of hinge assemblies connected between said cab and said window unit to enable the latter to be moved between a closed position relative to said roof opening and an open tilted position clear of said roof opening and adjacent the rear side of said cab;
   each hinge assembly comprising a link;
   first pivot means for pivotally connecting one end of said link to a first point on said cab adjacent a lateral edge of said roof opening, said link being pivotable about said first point to a position wherein said link is supported by said cab between said rear side of said cab and the rear edge of said roof opening;
   and second pivot means for pivotally connecting the other end of said link to a second point on said window unit adjacent a lateral edge of said window unit, said window unit being pivotable about said second point;
   said second point being located between said first point and the front edge of said roof opening when said window unit is in closed position and being locatable rearwardly of said first point when said window unit is swung to open position;
   said second point being located so that the center of gravity of said window unit lies near said second point whereby said window unit tilts to a position adjacent said rear side of said cab.

2. An operator's cab according to claim 1 including a brace rigidly connected between the links in said pair of hinge assemblies.

3. An operator's cab according to claim 1 including stop means on said window unit engagable with at least one pivot link for preventing rotation of said window unit about said second pivot point when said window unit is in open position.

4. In an operator's cab for a crane or the like:
   a cab having a rear side and a roof with a roof opening in the latter;
   a movable window unit;
   and a pair of hinge assemblies connected between said cab and said window unit to enable the latter to be moved between a closed position overlying said roof opening and an open tilted position clear of said roof opening and adjacent the rear side of said cab;
   each hinge assembly comprising a pivot link;
   first pivot means for pivotally connecting one end of said pivot link to a first pivot point on said cab adjacent a lateral edge of said roof opening, said pivot link being pivotable about said first pivot point between a position within said roof opening and a position wherein said pivot link overlies and is supported by a portion of said roof between said rear side of said cab and the rear edge of said roof opening;
   second pivot means for pivotally connecting the other end of said pivot link to a second pivot point on said window unit adjacent a lateral edge of said window unit, said window unit being pivotable about said second pivot point;
   said second pivot point being located between said first pivot point and said front edge member of said roof opening when said window unit is in closed position and being locatable rearwardly of said first pivot point when said window unit is swung to open position;
   said second pivot point being located so that the center of gravity of said window unit lies near said second pivot point whereby said window unit tilts to a position adjacent said rear side of said cab;
   said stop means on said window unit engagable with at least one pivot link for preventing rotation of said window unit about said second pivot point when said window unit is in open position.

5. An operator's cab according to claim 4 including a brace rigidly connected between the links in said pair of hinge assemblies.

6. In an operator's cab for a crane or the like:
   a cab having a rear side and a roof, said roof having a roof opening therethrough defined by spaced apart lateral side edge members and front and rear edge members;
   a movable window unit for said opening comprising a window frame and a window in said window frame, said window frame having lateral sides;
   a pair of hinge assemblies connected between said lateral side edge members of said cab roof and said lateral sides of said window frame to enable said window unit to be moved between a closed position overlying said opening and an open tilted position wherein said window unit is clear of said opening and adjacent the rear side of said cab;
   each hinge assembly comprising an L-shaped pivot link; a first pivot pin for pivotally connecting one end of said pivot link to the lateral edge members of said roof opening at a first point, said pivot link being pivotable about said first pivot point; and a second pivot pin for pivotally connecting the other end of said pivot link to the lateral side of said window frame, said window unit being pivotable about said second pivot point;

said second pivot point being located between first pivot point and said front edge member of said roof opening when said window unit is in closed position and being locatable rearwardly of said first pivot point when said window unit is swung to open position whereby said window unit tilts to a position adjacent said rear side of said cab;

said pivot link overlying and supported by said rear edge member of said roof when said window unit is in open position and said window is lying adjacent said rear side of said cab;

and stop means on said window unit engagable with at least one pivot link for preventing rotation of said window unit about said second pivot point when said window unit is in open position.

7. An operator's cab according to claim 6 including a brace rigidly connected between the links in said pair of hinge assemblies.

8. In an operator's cab for a crane or the like:

a cab having a rear side and a roof, said roof having a roof opening therethrough defined by spaced apart lateral side edge members and front and rear edge members;

a movable window unit for said opening comprising a window frame and a window in said window frame, said window frame having lateral sides;

a pair of hinge assemblies connected between said lateral side edge members of said cab roof and said lateral sides of said window frame to enable said window unit to be moved between a closed position overlying said opening and an open position wherein said window unit is clear of said opening and adjacent the rear side of said cab;

each hinge assembly comprising an L-shaped pivot link; a first pivot pin for pivotally connecting one end of said pivot link to the lateral edge members of said roof opening at a first point, said pivot link being pivotable about said first pivot point; and a second pivot pin for pivotally connecting the other end of said pivot link to the lateral side of said window frame, said window unit being pivotable about said second pivot point;

said second pivot point being located between first pivot point and said front edge member of said roof opening when said window unit is in closed position and being locatable rearwardly of said first pivot point when said window unit is swung to open position;

said pivot link overlying said rear edge member of said roof when said window unit is in open position and said window is lying adjacent said rear side of said cab;

a brace rigidly connected between the pivot links in said pair of hinge assemblies;

and stop means on said window unit engagable with at least one pivot link for preventing rotation of said window unit about said second pivot point when said window unit is in open position.

* * * * *